United States Patent
Sugibuchi

(10) Patent No.: US 9,798,739 B2
(45) Date of Patent: Oct. 24, 2017

(54) IC CARD AND IC CARD CONTROL METHOD

(71) Applicant: Kabushiki Kaisha Toshiba, Tokyo (JP)

(72) Inventor: Kei Sugibuchi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 122 days.

(21) Appl. No.: 14/031,275

(22) Filed: Sep. 19, 2013

(65) Prior Publication Data

US 2014/0081937 A1    Mar. 20, 2014

(30) Foreign Application Priority Data

Sep. 20, 2012   (JP) ................................ 2012-207546

(51) Int. Cl.
*G06F 17/30* (2006.01)

(52) U.S. Cl.
CPC .............................. *G06F 17/30227* (2013.01)

(58) Field of Classification Search
CPC ......... G06F 17/30312; G06F 17/30371; G06F 17/30227; G06F 9/466; G06F 9/467
See application file for complete search history.

(56) References Cited

U.S. PATENT DOCUMENTS

| | | | |
|---|---|---|---|
| 6,856,993 B1 * | 2/2005 | Verma ............... | G06F 17/30227 |
| 6,970,970 B2 | 11/2005 | Jung et al. | |
| 7,908,255 B2 * | 3/2011 | Detlefs et al. ................ | 707/703 |
| 8,010,497 B2 * | 8/2011 | Verma et al. ................. | 707/662 |
| 2002/0078244 A1 * | 6/2002 | Howard ........................ | 709/248 |
| 2009/0164750 A1 * | 6/2009 | Atri et al. ..................... | 711/209 |
| 2009/0228473 A1 * | 9/2009 | Kannan et al. ................... | 707/5 |
| 2010/0240413 A1 | 9/2010 | He et al. | |

FOREIGN PATENT DOCUMENTS

| | | |
|---|---|---|
| EP | 1006478 A2 | 6/2000 |
| EP | 1006478 B1 | 11/2006 |
| JP | 2000-172804 | 6/2000 |
| JP | 2000-172804 A | 6/2000 |
| JP | 2001-101053 A | 4/2001 |

(Continued)

OTHER PUBLICATIONS

ISO/IEC 7816-4 (Jan. 15, 2005).

(Continued)

*Primary Examiner* — Robert Beausoliel, Jr.
*Assistant Examiner* — Arthur Ganger
(74) *Attorney, Agent, or Firm* — Baker Botts L.L.P.

(57) ABSTRACT

An IC card includes a communication unit, a storage unit that stores a file, and a controller that interprets and executes a command instruction. The controller judges, when a command that instructs to select a dedicated file is input from an external apparatus, whether a certain fixed value is inserted at a predetermined position of the command, starts, when judged that the certain fixed value is inserted in a non-transaction state, transaction processing after accepting the command as a transaction start instruction simultaneous with the selection of the dedicated file, accepts, when judged that the certain fixed value is inserted during the transaction processing.

7 Claims, 3 Drawing Sheets

(56) References Cited

FOREIGN PATENT DOCUMENTS

| JP | 2003-114831 | 4/2003 |
| JP | 2003-114831 A | 4/2003 |
| JP | 2004-127205 A | 4/2004 |

OTHER PUBLICATIONS

Search Report and Written Opinion issued in related Singapore Patent Application No. 2013065388 mailed Aug. 17, 2015. 6 pages.
Office Action issued in related Japanese patent application No. 2012-207546, issued on Jan. 27, 2016 (6 pages with translation).
Official Action issued in related Singapore patent application No. 2013065388, mailed on Mar. 23, 2016 (6 pages).

* cited by examiner

IC CARD AND IC CARD CONTROL METHOD

CROSS-REFERENCE TO RELATED APPLICATIONS

This application is based upon and claims the benefit of priority from prior Japanese Patent Application No. 2012-207546, filed Sep. 20, 2012, the entire contents of which are incorporated herein by reference.

FIELD

An embodiment relates to an IC (Integrated Circuit) card, capable of processing information upon reception of transaction start, cancel, and commit instructions, and an IC card control method.

BACKGROUND

An IC card that is inserted into a cellular phone to be used is called a UIM (User Identity Module) card. Regarding the UIM card, a case of supporting a "remote file management function" for executing a file management command from a remote server via a cellular phone and the like is increasing. In the remote file management, since a command response is exchanged via a wireless communication path of the cellular phone, it is necessary to prepare for a disconnection of the wireless communication, and thus a realization of a transaction processing function is desired in processing a series of atomic commands. The above mentioned technology is disclosed in the following documents

[Patent Document 1] Japanese Patent Application Laid-open No. 2003-114731

[Patent Document 2] Japanese Patent Application Laid-open No. 2000-172804

DETAILED DESCRIPTION

As described above, in the remote file management for the IC card called a UIM card, since a command response is exchanged via the wireless communication path of the cellular phone, it is necessary to prepare for a disconnection of the wireless communication. In addition, in processing a series of atomic commands, a realization of a transaction processing function is desired so as not to cause inconsistency in an inter-file relationship even when receiving a plurality of commands at the same time through the communication.

This embodiment has been made in view of the circumstances as described above and aims at providing an IC card capable of executing transaction processing so as not to cause inconsistency in an inter-file relationship even when a plurality of commands are received at the same time through the communication.

According to an embodiment of the present invention, there is provided an IC (Integrated Circuit) card including a communication unit that sends and receives information to/from an external apparatus, a storage unit that stores a file of the information, and a controller that interprets and executes a command instruction from the external apparatus. The controller judges, when a command that instructs to select a dedicated file is input from the external apparatus via the communication unit, whether a certain fixed value is inserted at a predetermined position of the command, starts, when judged that the certain fixed value is inserted in a non-transaction state, transaction processing after accepting the command as a transaction start instruction simultaneous with the selection of the dedicated file, accepts, when judged that the certain fixed value is inserted during the transaction processing, the command as a commit instruction, and collectively reflects an operation performed during the transaction processing on all files managed under the dedicated file as a target.

Hereinafter, an IC card according to an embodiment of the present invention will be described with reference to the drawings.

It should be noted that in this embodiment, a command is of an APDU (Application Data Unit) format defined by ISO/IEC 7816. Exchanges between the APDU-format IC card and an external apparatus assume exchanges in a block unit as in Remote APDU format defined in Chapter 5 of ETSI TS 102.226 and does not assume exchanges based on a character transmission as in a so-called T=0 protocol defined by ISO/IEC 7816-3.

Figure 1:
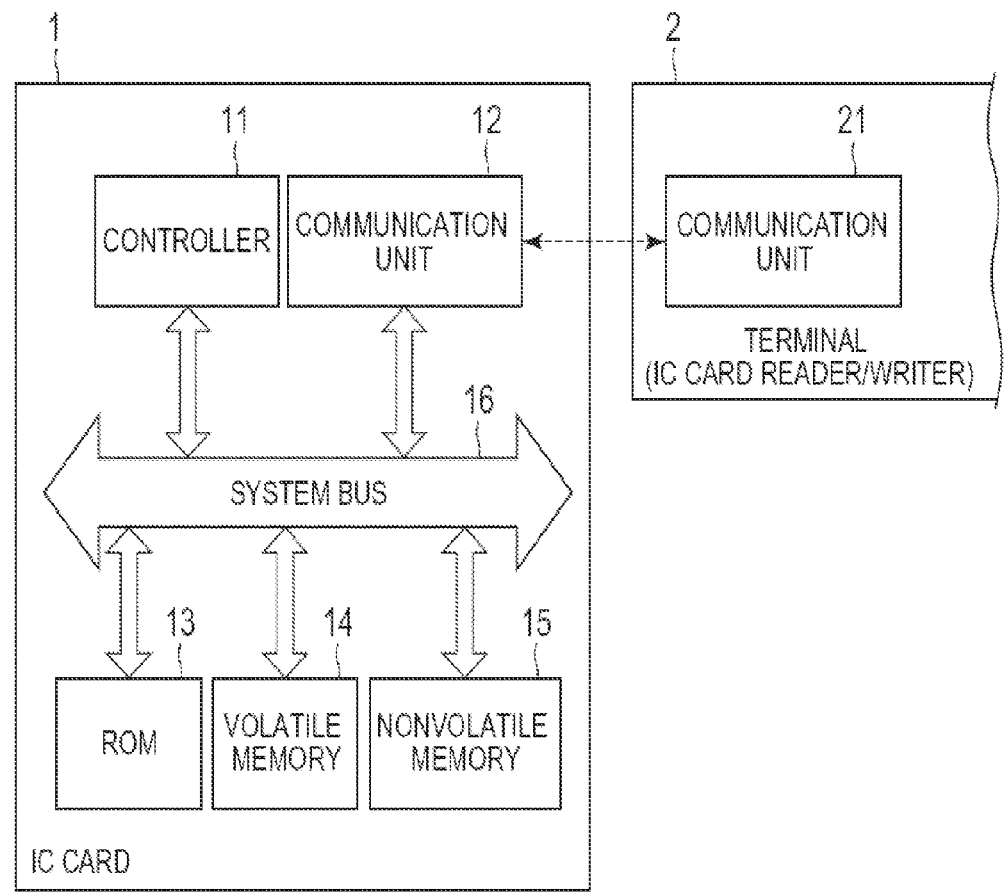
FIG. 1 is a block diagram showing a hardware structure of an IC card according to an embodiment of the present invention.

FIG. 1 is a block diagram showing a hardware structure of an IC card and a reader/writer (reader/writer apparatus) of this embodiment. In FIG. 1, the IC card 1 is constituted of a controller 11 including a CPU (Central Processing Unit), a communication unit 12 including a UART (Universal Asynchronous Receiver Transmitter) used for communicating with an IC card reader/writer 2, a ROM (Read Only Memory) 13 that stores program codes, a volatile memory (RAM: Random Access Memory) 14 that temporarily stores data as a working memory, a nonvolatile memory (NVM: Non-Volatile Memory) 15 capable of rewriting data, and a system bus 16 connecting those components. The NVM 15 functions as a commit buffer.

On the other hand, the IC card reader/writer 2 includes a communication unit 21 including UART used for communicating with the IC card 1 and exchanges instructions, commands, and information with the IC card 1 in response to instructions from a server (not shown).

Hereinafter, processing functions of this embodiment in the structure described above will be described.

This embodiment realizes transaction start, cancel, and commit based on a new SELECT command to be described later. Table 1 shows operations carried out when a DF (Dedicated File) defined by ISO/IEC 7816-3 is selected based on a SELECT command of the related art and a new SELECT command. It should be noted that it is possible to judge which of a transaction state and a non-transaction state a target DF is in using a DF list in a transaction state to be described later.

TABLE 1

Operations performed when DF (Dedicated File) is selected

| SELECT command | Selection target | Meaning | Operation outline |
|---|---|---|---|
| SELECT command of related art | DF in non-transaction state | None | Target DF is selected (operation of related art) |
| SELECT command of related art | DF in transaction state | Transaction cancel instruction | Target DF is selected Target DF is put to non-transaction state (transaction cancel without being committed) |
| New SELECT command | DF in non-transaction state | Transaction start instruction | Target DF is selected Target DF is put to transaction state |
| New SELECT command | DF in transaction state | Commit instruction | Target DF is selected Updates for all files managed under target DF are committed Target DF is put to non-transaction state |

Here, a C-APDU (Command APDU) SELECT command that the IC card 1 receives from the external apparatus normally has a structure as shown in Table 2 below. This table shows a normal structure of C-APUD TLV.

TABLE 2

Structure of SELECT command

| Structural element | Length (byte) |
|---|---|
| Command class CLA | 1 |
| Command instruction code INS | 1 |
| P1 parameter | 1 |
| P2 parameter | 1 |
| Lc (optional) | 0 or 1 |
| Data (optional) | Lc |
| Le (optional) | 0 or 1 |

In contrast, a new SELECT command proposed in this embodiment has a structure shown in Table 3.

TABLE 3

Structure of new SELECT command

| Structural element | Length (byte) |
|---|---|
| Command class CLA | 1 |
| 0xFF (fixed value) | 1 |
| Command instruction code INS | 1 |
| P1 parameter | 1 |
| P2 parameter | 1 |
| Lc (optional) | 0 or 1 |
| Data (optional) | Lc |
| Le (optional) | 0 or 1 |

Specifically, in the structure of the new SELECT command, a fixed value 0xFF is inserted between the CLA area and INS area of the related art as shown in Table 3.

Subsequently, the transaction-state DF list will be described.

Figure 2:
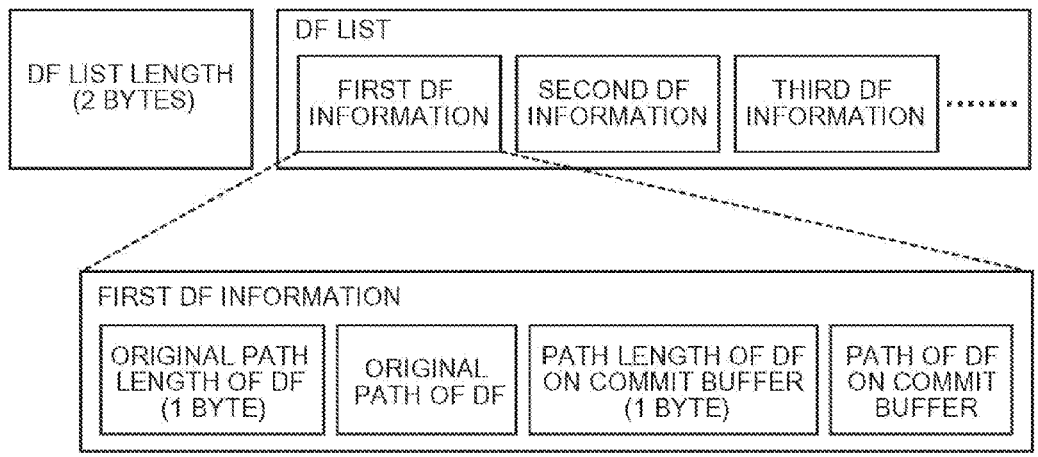
FIG. 2 is a schematic diagram showing a structural example of a file list in midst of transaction processing in the embodiment.

The IC card 1 holds, as a list, an original path of a DF in the transaction state and a path on the commit buffer to be described later in the RAM 14. A structural example of the list is shown in FIG. 2. When the IC card is activated, the list (2 bytes) is empty, and pieces of information on a DF for which a transaction start instruction has been received (original path length of DF (1 byte), original path of DF, path length of DF on commit buffer (1 byte), and path of DF on commit buffer) are sequentially added to the list. Further, when commit is actually completed upon receiving a commit instruction, a DF for which a transaction cancel instruction has been received is deleted from the list.

Here, the IC card 1 has the commit buffer in the NVM 15. The DF for which the transaction start instruction has been received is copied to the commit buffer together with all the files managed under the DF. Moreover, when receiving a commit instruction, a content of a file on the commit buffer, that is at an original path, is overwritten, and the file on the commit buffer is deleted.

Figure 3:
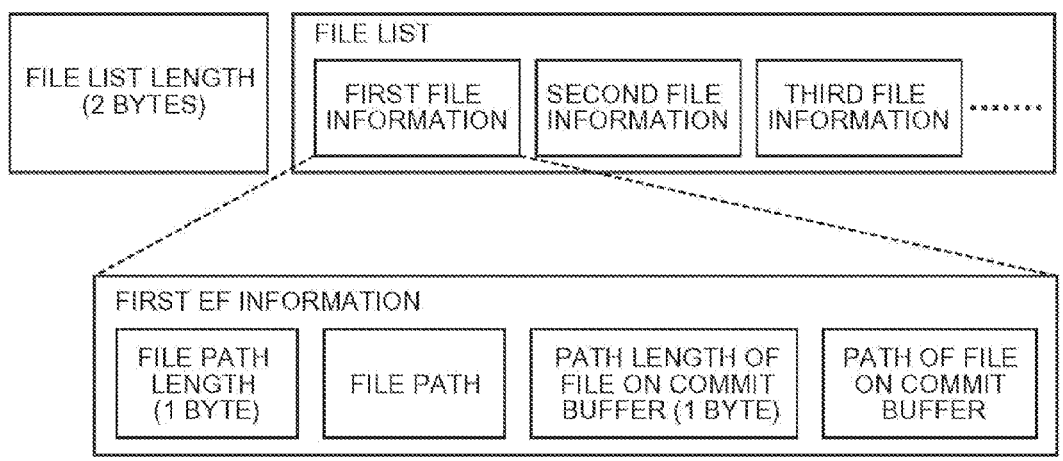
FIG. 3 is a schematic diagram showing a structural example of a file list being committed in the embodiment.

On the other hand, in preparation of a power disconnection that may be caused while a file on the commit buffer is written in an original file upon reception of a commit instruction, the IC card 1 holds a being-committed file list (2 bytes) in the NVM 15. A structure of the file list is shown in FIG. 3.

Specifically, the IC card 1 writes, right before executing commit, addresses (logical paths) for accessing all files managed under the commit target DF in the NVM 15 as a commit file list (file path length (1 byte), file path, file path length on commit buffer (1 byte), and file path on commit buffer) and sequentially deletes data in the area every time commit of a file is completed. The IC card 1 confirms, when activated, whether there is file information being committed, and executes commit based on data remaining in the commit buffer when there is file information.

Figure 4:
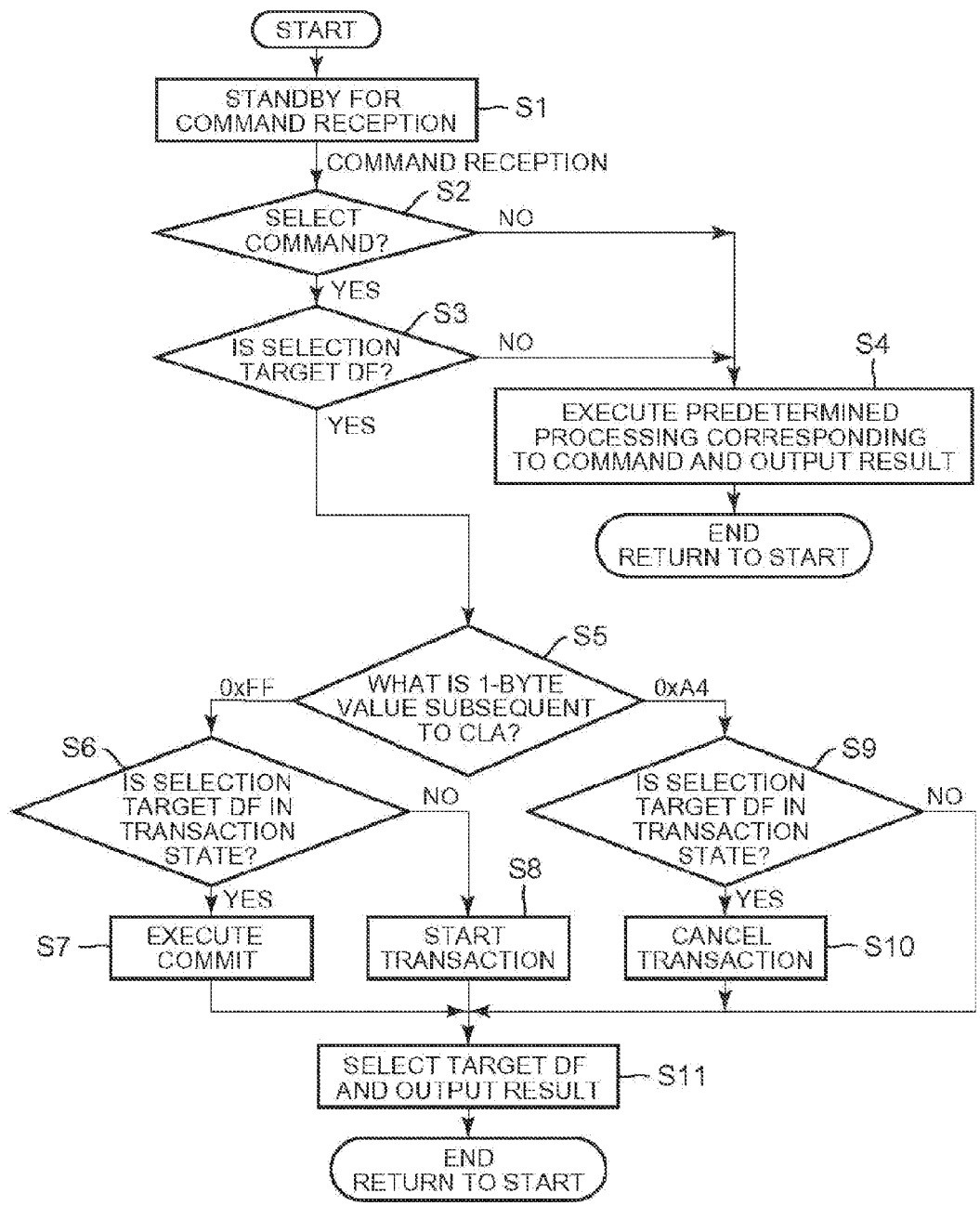
FIG. 4 is a flowchart showing a flow of processing of the IC card of the embodiment.

A flow of processing of the proposed embodiment that is carried out in the structure described above will be described with reference to the flowchart shown in FIG. 4.

First, in Step S1, the IC card 1 stands by for reception of C-APDU TLV. After reception, the processing advances to Step S2.

In Step S2, confirmation is made on whether the received command is a SELECT command. Specifically, the confirmation is made through following Steps S21 to S23.

First, when a 1-byte value subsequent to CLA is 0xA4 (S21), the received command is authorized as a SELECT command, and the processing advances to Step S3. When 2-byte values subsequent to CLA are 0xFF and 0xA4 (S22), the received command is authorized as a SELECT command, and the processing advances to Step S3. When judged negative in both Steps S21 and S22, the received command is not a SELECT command, and the processing advances to Step S4.

The processing advances from Step S3 to Step S5 when a target to be selected by the SELECT command is a DF and advances to Step S4 in cases otherwise. In Step S4, predetermined processing corresponding to the received command is executed. A processing result is output to the external apparatus, and the processing returns to Step S1 to stand by for command reception.

On the other hand, in Step S5, the IC card 1 confirms the next 1-byte value of the CLA area. The processing advances to Step S6 when the value is 0xFF and advances to Step S9 when the value is 0xA4.

In Step S6, the received SELECT command is a new SELECT command proposed in this embodiment. The processing advances to Step S7 when a DF as a selection target of the command is included in the transaction-state DF list and advances to Step S8 in cases otherwise.

In Step S7, a transaction with respect to the target DF is committed, and the processing advances to Step S11. The commit of Step S7 is realized by the following series of processing.

First, original paths of all files managed under the target DF and paths on the commit buffer are added to the being-committed file list (S71). Then, for one file in the being-committed file list, an original content is overwritten by a content on the commit buffer (S72). The overwritten file is deleted from the being-committed file list (S73). Then, the overwrite processing (S72) and deletion processing (S73) are repeated until the being-committed file list becomes empty (S74). Finally, the target DF on the commit buffer and an EF (Elementary File: basic file) are deleted (S75), and the target DF is deleted from the transaction-state DF list (S76).

In Step S8, a transaction with respect to the target DF is started, and the processing advances to Step S11. The transaction start in Step S8 is realized by first copying the target DF and all files managed under the target DF to the commit buffer (S81) and adding the target DF to the transaction-state file list (S82).

In Step S9, the received SELECT command is a SELECT command of the related art. The processing advances to Step S10 when a DF as a selection target of the command is included in the transaction-state DF list and advances to Step S11 in cases otherwise.

In Step S10, a transaction with respect to the target DF is canceled, and the processing advances to Step S11. The transaction cancel is realized by deleting the target DF and the files on the commit buffer (S101) and deleting the target DF from the transaction-state DF list (S102).

Finally, in Step S11, the target DF is selected, the result is output, and the processing returns to Step S1.

According to the structure of this embodiment that executes the processing operation described above, the transaction start instruction, commit instruction, and transaction cancel instruction can be received simultaneous with the command, and thus atomic transaction processing in DF units becomes possible.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form the methods and systems described herein may be made without departing from the sprit of the inventions. The accompanying claims and their equivalents are intended to cover such forms or modifications as would fall within the scope and spirit of the inventions.

What is claimed is:

1. An IC card, comprising:
    a communication unit that receives command from and sends response to an external apparatus;
    a first storage unit that stores a file of information;
    a second storage unit that stores a DF (dedicated file) list in a transaction state;
    a controller that:
    interprets and executes a command from the external apparatus,
    determines, when a command that instructs to select a dedicated file is input from the external apparatus via the communication unit, whether a certain fixed value is inserted at a predetermined position of the command,
    starts, when the controller determines that the certain fixed value is inserted into the command if the dedicated file is not stored in the second storage unit, transaction processing after accepting the command as a transaction start instruction simultaneous with the selection of the dedicated file instructed to select by the command,
    cancels, when the controller determines that the certain fixed value is not inserted into the command if the dedicated file is stored in the second storage unit, transaction processing,
    makes, when the controller determines that the certain fixed value is not inserted into the command if the dedicated file is not stored in the second storage unit, into a selective state the dedicated file,
    accepts, when the controller determines that the certain fixed value is inserted into the command if the dedicated file is stored in the second storage unit, the command as a commit instruction, and
    collectively reflects an operation performed during the transaction processing on all files managed under the dedicated file as a target.

2. The IC card according to claim 1,
    wherein the first storage unit includes a commit buffer constituted of a nonvolatile memory, and
    wherein the controller copies a content of all the files managed under the dedicated file to the commit buffer upon receiving the transaction start instruction, and reflects, upon receiving the commit instruction, a content of the commit buffer on an original area.

3. The IC card according to claim 2,
    wherein the controller holds, upon receiving the commit instruction, a list of files being committed in the commit buffer in preparation of a power disconnection that may be caused while a file in the commit buffer is being written to an original file.

4. The IC card according to claim 1,
    wherein the controller judges whether a dedicated file, which is designated by the command, is included in the second storage unit or not.

5. An IC card control method having a communication unit that receives command and sends response to an external apparatus, a first storage unit that stores a file of information and a second storage unit that stores a DF (dedicated file) list in a transaction state, a controller that interprets and executes a command from the external apparatus, comprising:
    determining, when a command that instructs to select a dedicated file is input from the external apparatus via the communication unit, whether a certain fixed value is inserted at a predetermined position of the command;

starting, when the controller determines that the certain fixed value is inserted into the command if the dedicated file is not stored in the second storage unit, transaction processing after accepting the command as a transaction start instruction simultaneous with the selection of the dedicated file instructed to select by the command;

cancelling, when the controller determines that the certain fixed value is not inserted into the command if the dedicated file is stored in the second storage unit, transaction processing, making, when the controller determines that the certain fixed value is not inserted into the command if the dedicated file is not stored in the second storage unit, into a selective state the dedicated file, accepting, when the controller determines that the certain fixed value is inserted into the command if the dedicated file is stored in the second storage unit, the command as a commit instruction; and collectively reflecting an operation performed during the transaction processing on all files managed under the dedicated file as a target.

6. The method according to claim 5, further comprising:

copying a content of all the files managed under the dedicated file to a commit buffer upon receiving the transaction start instruction wherein the storage unit includes the commit buffer constituted of a nonvolatile memory; and reflecting, upon receiving the commit instruction, a content of the commit buffer on an original area.

7. The method according to claim 6, further comprising:

holding, upon receiving the commit instruction, a list of files being committed in the commit buffer in preparation of a power disconnection that may be caused while a file in the commit buffer is being written to an original file.

* * * * *